United States Patent
Gu et al.

(10) Patent No.: US 11,597,857 B2
(45) Date of Patent: Mar. 7, 2023

(54) METHOD OF PREPARING ELASTIC PRESSURE-SENSITIVE ADHESIVE TAPE AND ELASTIC PRESSURE-SENSITIVE ADHESIVE TAPE

(71) Applicant: SUZHOU SHIHUA NEW MATERIAL TECHNOLOGY CO., LTD., Jiangsu (CN)

(72) Inventors: Zhengqing Gu, Jiangsu (CN); Shuai Zhou, Jiangsu (CN); Jianrong Ji, Jiangsu (CN)

(73) Assignee: SUZHOU SHIHUA NEW MATERIAL TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 17/763,216

(22) PCT Filed: Jul. 30, 2020

(86) PCT No.: PCT/CN2020/105984
§ 371 (c)(1),
(2) Date: Mar. 24, 2022

(87) PCT Pub. No.: WO2021/057255
PCT Pub. Date: Apr. 1, 2021

(65) Prior Publication Data
US 2022/0356378 A1    Nov. 10, 2022

(30) Foreign Application Priority Data
Sep. 24, 2019    (CN) .......................... 201910904122.6

(51) Int. Cl.
C08J 9/32    (2006.01)
C09J 7/38    (2018.01)
(Continued)

(52) U.S. Cl.
CPC .................. *C09J 7/385* (2018.01); *C08J 9/32* (2013.01); *C09J 7/22* (2018.01); *C09J 7/40* (2018.01);
(Continued)

(58) Field of Classification Search
CPC .. C09J 7/385; C09J 2301/412; C08J 2203/22; C08J 9/32
See application file for complete search history.

(56) References Cited

U.S. PATENT DOCUMENTS

| | | | |
|---|---|---|---|
| 2009/0181250 A1* | 7/2009 | Zmarsly | C09J 155/02 428/343 |
| 2012/0148791 A1* | 6/2012 | Yamanaka | C09J 7/385 428/114 |

(Continued)

FOREIGN PATENT DOCUMENTS

| | | |
|---|---|---|
| CN | 1427771 A | 7/2003 |
| CN | 106661424 A | 5/2017 |

(Continued)

OTHER PUBLICATIONS

Notice of Allowance of counterpart Chinese Patent Application No. 201910904122.6 dated Apr. 17, 2020.
(Continued)

*Primary Examiner* — Scott W Dodds

(57) ABSTRACT

Disclosed are a method of preparing an elastic pressure-sensitive adhesive tape and an elastic pressure-sensitive adhesive tape. Main components of the adhesive include a polyacrylate resin with a carbon-carbon double bond and a diluent monomer with a carbon-carbon double bond. A quasi-microcapsule powder component is adopted, wherein the shell material of the quasi-microcapsule powder selects a cellulose-based water soluble polymer, and the core material selects low boiling point alkane, wherein the preparation method combines UV curing, heating, and shell burst, to
(Continued)

obtain an elastic adhesive layer, whereby to prepare a pressure-sensitive adhesive tape product. Compared with conventional elastic pressure-sensitive adhesive tapes, the preparing method as disclosed has a simple manufacturing process. The pressure-sensitive adhesive tape obtained from the disclosed preparing method overcomes the restrictions of conventional foam strips and provide good cushioning and compression properties without using foam as the carrier.

9 Claims, 1 Drawing Sheet

(51) Int. Cl.
*C09J 7/22* (2018.01)
*C09J 7/40* (2018.01)
*C09J 11/06* (2006.01)
*C09J 133/08* (2006.01)

(52) U.S. Cl.
CPC .............. *C09J 11/06* (2013.01); *C09J 133/08* (2013.01); *C08J 2203/22* (2013.01); *C09J 2203/326* (2013.01); *C09J 2301/124* (2020.08); *C09J 2301/302* (2020.08); *C09J 2301/408* (2020.08); *C09J 2301/412* (2020.08); *C09J 2301/416* (2020.08)

(56) References Cited

U.S. PATENT DOCUMENTS

2017/0121573 A1* 5/2017 Bogner ...................... C09J 7/20
2019/0292411 A1* 9/2019 Kim ...................... B32B 17/061

FOREIGN PATENT DOCUMENTS

| | | |
|---|---|---|
| CN | 108699403 A | 10/2018 |
| CN | 109504306 A | 3/2019 |
| TW | 201533188 A | 9/2015 |

OTHER PUBLICATIONS

1st Office Action of counterpart Chinese Patent Application No. 201910904122.6 dated Mar. 24, 2020.

* cited by examiner

METHOD OF PREPARING ELASTIC PRESSURE-SENSITIVE ADHESIVE TAPE AND ELASTIC PRESSURE-SENSITIVE ADHESIVE TAPE

FIELD

The disclosure relates to pressure-sensitive adhesive tapes, and more particularly relates to a method of preparing an elastic pressure-sensitive adhesive tape and an elastic pressure-sensitive tape.

BACKGROUND

Smart electronics are becoming increasingly demanding on drop performance, anti-deformation, water-resistance, and dust-proof properties. To satisfy such performance and properties, an excellent cushioning, energy-absorbing material is needed. The currently available pressure-sensitive adhesive (PSA) tapes with a cushioning property are mostly foam tapes.

Foam tapes take foam as their carrier. Thanks to their higher thickness over typical adhesive tapes and their good properties in sealing and shock absorption, foam tapes have applications in an array of fields. Foam typically refers to a foamable material such as polyolefin or polyurethane. Fabrication of foam strips includes: heating and shearing the polyolefin or polyurethane to a high-temperature molten state using a screw extruder, co-mixing the molten polyolefin or polyurethane with the electron beam-excited foaming agent, followed by extrusion molding, irradiation foaming, cutting and fixing processes. Fabrication of a foam tape typically goes through the following processes: coating a pressure-sensitive adhesive to a release film, followed by curing, and then laminating the cured film to foam. Such fabricated foam tapes always have some inherent downsides in their fabrication and application due to the characteristics of foam strips: (1) the polyolefin or polyurethane used by the foam material has a poor heat resistant property, and without enough support from external tension, the foam material will be shrunk, bulged or otherwise deformed to some extents at 80° C., such that the foam strip cannot be subjected to a high-temperature process, which means the foam tape cannot be manufactured by directly coating a liquid adhesive to the foam surface: a solvent adhesive requires high-temperature for solvent removal and curing, while a UV adhesive will produce high temperature in the long-time UV curing process, both of which will cause foam deformation; therefore, the foam tape can only be fabricated by first coating the pressure-sensitive adhesive to a release film and then laminating the release film to the foam. Moreover, the surface energy of the foam is usually less than 32 dynes, such that to enhance surface energy of the foam, processes including corona and pre-coating adhesion promoter are required to ensure an enough bonding strength after the pressure-sensitive adhesive layer is laminated to the foam surface; the complex fabrication process incurs a high manufacturing cost. (2) The foam tape needs to be die cut into various shapes to adapt to the to-be-cushioned devices prior to being assembled to the inside of a smart electronic product; however, due to its inherent fragility, the polyolefin or polyurethane easily produces powder scraps during the die-cutting process; however, the electronic products are highly demanding on cleanness, which requires constantly checking whether scrap powders are present in the device to which the foam tape is adhered, which increases quality overheads. (3) Once a bubble construction formed in the foaming process is damaged during the die-cutting process, a permanent open construction arises, resulting in that dusts and water vapor easily penetrate into the foam via such open constructions and pass through the foam along the porous structure inside the foam, such that to avoid containment, a sealing construction is required for precision devices that have strict restrictions on water vapor and dusts, which increases structure overheads.

In view of the above, many domestic and foreign enterprises have attempted to develop better foam tapes, e.g., by adjusting the foam fabrication process to produce foam of a closed-cell construction, whereby a foam tape prepared with such foam as the carrier may reduce and avoid invasion of water vapor and dusts; or, introducing some oligomer which may enhance the surface energy in the process of fabricating the polyurethane foam, thereby reducing pre-treatment overheads in transferring the pressure-sensitive adhesive layer to the foam. Although the two approaches may improve the performance of foam tapes, the closed-cell construction of the former method is only suitable for applications in large-sized devices, because in small-sized devices, once the closed-cell construction is damaged in the die-cutting process, a full-pass occasion still likely occur; while the latter method only has a limited enhancement regarding the surface energy of the foam, such that pre-treatment is still needed in manufacturing of highly viscous foam tapes. 3M Corporation develops a scheme of adopting a very low cross-link density viscoelastic core material and a high cross-link density viscoelastic skin layer, wherein the core material may convert the external impact to mechanical relaxation owing to its high loss-frequency characteristic under high-frequency shearing, thereby achieving a cushioning performance like a foam tape. However, the cushioning performance of this scheme is inferior to the foam-based tape, which still needs a foam construction to enhance the cushioning performance.

Another scheme has been reported, comprising: applying expandable polymeric microspheres to an adhesive, obtaining a pressure-sensitive adhesive sheet through die head extrusion, and then laminating with a liner layer to form the adhesive tape. This scheme has the following drawbacks: (1) infeasibility in preparing thinner PSA tapes (less than 200 μm), thus hardly applied to an ultrathin space; (2) the expandable polymeric microsphere is only partially expanded prior to discharging the adhesive composition out of the die head. The extruded expandable polymeric microsphere may be further expanded after being heated; when such expandable polymeric microspheres are applied to bonding in electronic devices, there exists a risk of continued expansion to damage the devices; (3) the expanded polymeric microsphere has a fixed shell is fixed, such that the elasticity/compressibility of the finally formed pressure-sensitive adhesive sheet is restricted by the mechanical strength of the microsphere shell; therefore, to change the elasticity of the microsphere, it is needed to adjust the material and thickness of the shell; (4) the process of fabricating the expandable polymeric microsphere is relatively complex, and the shell has a high mechanical strength, which needs a temperature above 100° C. to realize expansion; (5) this scheme leverages a melt extrusion process, which requires a bulky and complex feeding device; and expansion of the polymeric microsphere requires a temperature above 100° C.; therefore, this scheme has a high energy consumption and a complex process. The reported pressure-sensitive sheet is not suitable for current light and thin smart electronics.

SUMMARY

To overcome the above and other drawbacks in conventional technologies, an object of the disclosure is to provide a method of preparing an elastic pressure-sensitive adhesive tape applicable to light and thin smart electronics. The elastic pressure-sensitive adhesive tape prepared according to the method overcomes the limitation of traditional foam strips because the pressure-sensitive adhesive layer inherently has an elasticity, which may have good cushioning and compressibility without using foam as the carrier; moreover, compared with conventional elastic pressure-sensitive adhesive tapes, the preparing method of the disclosure has a simple manufacturing process and is suitable for bonding and fixation in light and thin smart electronics.

To achieve the above and other objectives, the disclosure provides the following solutions.

A method of preparing an elastic pressure-sensitive adhesive tape comprises steps of:

Step (1): coating an adhesive on a first substrate, and curing for 10 to 30 seconds in a UV curing and drying channel to preliminarily cure the adhesive; wherein components of the adhesive include: 1 to 20 parts by mass of quasi-microcapsule powder; 100 to 200 parts by mass of polyacrylate resin with a carbon-carbon double bond, 20 to 50 parts by mass of diluent monomer with a carbon-carbon double bond, 1 to 10 parts by mass of photoinitiator, 1 to 3 parts by mass of inhibitor, 30 to 50 parts by mass of liquid-state tackifier resin, 0 to 70 parts by mass of color paste; wherein the shell of the quasi-microcapsule powder includes a water soluble polymer, and the core material includes a low boiling point alkane with a boiling point below 40° C.

Step (2): re-heating for 2 to 5 minutes in the drying channel at a temperature gradient from 70° C. to 100° C. to cause the low boiling point alkane to rapidly evaporate, swell, and burst the shell, thereby forming a plurality of encapsulated bubbles inside the polyacrylate resin;

Step (3): further curing for 20 to 40 seconds in the UV curing and drying channel to completely cure the adhesive, such that an elastic pressure-sensitive adhesive layer is formed on the first substrate, thereby obtaining the elastic pressure-sensitive adhesive tape.

The elastic pressure-sensitive adhesive layer prepared by the disclosure has a compression ratio continuously adjustable in the range from 20% to 70% under 0.5 MPa.

In the method of preparing an elastic pressure-sensitive adhesive tape as disclosed, preparation of the adhesive comprises: first adding 20 to 50 parts of diluent monomer with a carbon-carbon double bond to an adhesive mixing container, adding sequentially the following to the adhesive mixing container while agitating: 30 to 50 parts of liquid-state tackifier resin, 100 to 200 parts of polyacrylate resin with a carbon-carbon double bond, and 1 to 3 parts of inhibitor till complete dispersion, followed by continuing agitation, and adding 1 to 20 parts of quasi-microcapsule powder; further sequentially adding 1 to 10 parts of photoinitiator to the adhesive while agitating till complete dissolution of the photoinitiator, and then adding 0 to 70 parts of pigment paste, followed by agitating homogeneously, and filtering for future use.

In the method of preparing an elastic pressure-sensitive adhesive tape as disclosed, preparation of the quasi-microcapsule powder comprises: swelling 1 to 3 parts of water soluble polymer in 100 to 200 parts of deionized water, lowering the temperature of the solution to 4° C. to 8° C., adding 3 to 5 parts of low boiling point liquid-state alkane, forming an emulsion through processing by an emulsification pump, the emulsion diameter being controlled to 2 to 5 μm, followed by vacuum freeze drying to remove moisture, thereby forming a dry powder of quasi-microcapsule construction.

In the method of preparing an elastic pressure-sensitive adhesive tape as disclosed, the quasi-microcapsule powder has a shell-core construction, wherein the shell includes a water soluble polymer, and the core includes a low boiling point alkane; wherein a material of the shell is preferably a cellulose-based water soluble polymer, more preferably one or more of methylcellulose, carboxymethyl cellulose, ethyl cellulose, hydroxyethyl cellulose, hydroxypropyl cellulose, and hydroxypropyl methyl cellulose; a material of the core is preferably one or more of n-pentane, isopentane, and neopentane. The shell material of the quasi-microcapsule powder has a relatively low strength, such that the core material, during evaporation and expansion, bursts the shell; therefore, the adhesive and quasi-microcapsule powder in the disclosure are both prepared under a low temperature; and the adhesive and the quasi-microcapsule powder are both stored under a temperature lower than the evaporation temperature of the core.

In the method of preparing an elastic pressure-sensitive adhesive tape, a glass transition temperature of the polyacrylate resin with a carbon-carbon double bond ranges from −40° C. to −15° C., and storage modulus and loss modulus thereof are both lower than $10^5$ Pa.

In the method of preparing an elastic pressure-sensitive adhesive tape, the diluent monomer with a carbon-carbon double bond comprises one or more of isobornyl acrylate, lauryl acrylate, and propenoate octadecyl.

In the method of preparing an elastic pressure-sensitive adhesive tape, the liquid-state tackifier resin is preferably liquid-state abietin, whose softening point ranges from −10° C. to 15° C.

In the method of preparing an elastic pressure-sensitive adhesive tape, the photoinitiator comprises one or more of photoinitiator 184, photoinitiator 127, photoinitiator 369, and TPO photoinitiator; and preferably, the photoinitiator is compounded using the UVC and UVA photoinitiators in the four TPO photoinitiator.

In the method of preparing an elastic pressure-sensitive adhesive tape as disclosed, the inhibitor is hydroquinone.

In the preparing method of the disclosure, the elastic pressure-sensitive adhesive layer has a thickness that is arbitrarily adjustable in a range from 50 to 250 μm.

In the disclosure, the first substrate is preferably a PET-based silicon release film, whose 20 h aging release force ranges from 10 to 50 gf/25 mm. The first substrate in the disclosure may also adopt other conventional substrates, as long as such substrates can withstand the temperature during the curing process and satisfy the range of 20 h aging release force.

In the case that the first substrate is a release film, the method of preparing an elastic pressure-sensitive adhesive tape further comprises: laminating a non-substrate side of the elastic pressure-sensitive adhesive layer resulting from step (3) to both sides of a second substrate, respectively, wherein the second substrate is one of PET, PI, PC, and PU, whose surface energy ranges from 36 to 38 dynes/cm.

In the case that the first substrate is a release film, the method of preparing an elastic pressure-sensitive adhesive tape further comprises: double-sided laminating the non-substrate side of the elastic pressure-sensitive adhesive layer resulting from step (3) to the second substrate.

When the first substrate in the disclosure adopts a non-release film substrate, the method of preparing an elastic pressure-sensitive adhesive tape as disclosed further comprises: laminating the non-substrate side of the elastic pressure-sensitive adhesive layer to the second substrate, wherein the second substrate is a release film.

The elastic pressure-sensitive adhesive layer formed on the first substrate in the elastic pressure-sensitive adhesive tape of the disclosure inherently has an elasticity, and the encapsulated bubbles are formed during the adhesive curing process. The components of the adhesive include a quasi-microcapsule powder construction, and the shell of the quasi-microcapsule powder adopts a water soluble polymer, preferably a cellulose-based water soluble polymer; the core material adopts a low boiling-point alkane; therefore, during the curing process, the curing temperature causes the core material of the quasi-microcapsule construction evaporated and swelled to burst open the shell of the quasi-microcapsule; finally, air is encapsulated by the pressure-sensitive adhesive, i.e., a plurality of encapsulated bubbles are formed in the elastic pressure-sensitive adhesive layer. In the disclosure, there is no limitation on specific number of the "plurality" of encapsulated bubbles, wherein an appropriate number may be selected based on the elasticity and cushioning performance required during use, causing the compression ratio of the elastic pressure-sensitive adhesive layer to be continuously adjustable in a range from 20% to 70% under 0.5 MPa, wherein the diameters of the encapsulated bubbles are distributed in a range from 30 to 150 µm.

The disclosure further provides an elastic pressure-sensitive adhesive tape, wherein the elastic pressure-sensitive adhesive tape is prepared by the method described above. The elastic pressure-sensitive adhesive tape obtained according to the disclosure may be a single-sided adhesive tape or a doubled-sided adhesive tape.

The method of preparing an elastic pressure-sensitive adhesive tape and the elastic pressure-sensitive adhesive tape prepared according to the disclosure offers the following beneficial effects over conventional technologies:

In the method of preparing an elastic pressure-sensitive adhesive tape according to the disclosure, the main components of the pressure-sensitive adhesive tape include a polyacrylate resin with a carbon-carbon double bond and a diluent monomer with a carbon-carbon double bond; the emulsion adhesive has a quasi-microcapsule powder construction; the shell material of the quasi-microcapsule powder adopts a water soluble polymer, preferably cellulose-based water soluble polymer; the core material adopts a low boiling point alkane, wherein the core material is heated to be evaporated and swelled to burst open the shell; the pressure-sensitive adhesive encapsulates the air to form encapsulated bubbles in the adhesive layer; the shell of the quasi-microcapsule effectively avoids the low boiling point alkane from mutual dissolution with the solvent and the diluent monomer; the final encapsulated bubble diameter may be effectively controlled by controlling the quasi-microcapsule diameter, which further controls compressibility of the pressure-sensitive adhesive layer; meanwhile, when the quasi-microcapsule is heated to crack, the shell does not swell synchronously with temperature elevation, such that the compressibility of the pressure-sensitive adhesive layer is totally provided by the encapsulated bubbles alone, thereby providing a better compressibility than the polymeric shell; moreover, the preparing process of the quasi-microcapsule according to the disclosure is simple, which has no special requirement on shell strength; besides, the shell can be burst open at a low temperature, and thermal expansion can be realized without a high temperature of over 100° C. Furthermore, compared with conventional processes of fabricating foam tapes and extruding elastic adhesive layers, the process of the disclosure is much simpler, and the resulting encapsulated bubble construction has been fully swelled upon completion of the coating operation, which avoids further swell, and thus avoids damages to the bonded devices caused by the re-reswell.

In the elastic pressure-sensitive adhesive tape prepared by the method of the disclosure, the elastic pressure-sensitive adhesive layer formed on the first substrate inherently has an elasticity, such that it does not need foam as the carrier; the elastic pressure-sensitive adhesive tape of the disclosure has good cushioning and compression properties.

The pressure-sensitive adhesive tape prepared by the method according to the disclosure does not have scrap powder containment when being die cut owing to the inherent pressure-sensitive bonding characteristics of the elastic pressure-sensitive adhesive layer; therefore, the scrap powder containment of the elastic pressure-sensitive adhesive tape is far superior to conventional foam tapes; meanwhile, the elastic pressure-sensitive adhesive tape may have customized thickness, viscosity, and compressibility according to actual applications and thus has a very flexible applicability.

The pressure-sensitive adhesive tape prepared by the method according to disclosure has a good sealing property at the slit, such that even the vesicles of the encapsulated bubble structure are damaged during the die cutting process, the pressure-sensitive adhesive will level out to fill gaps, preventing penetration of water and air.

DETAILED DESCRIPTION

Figure 1:
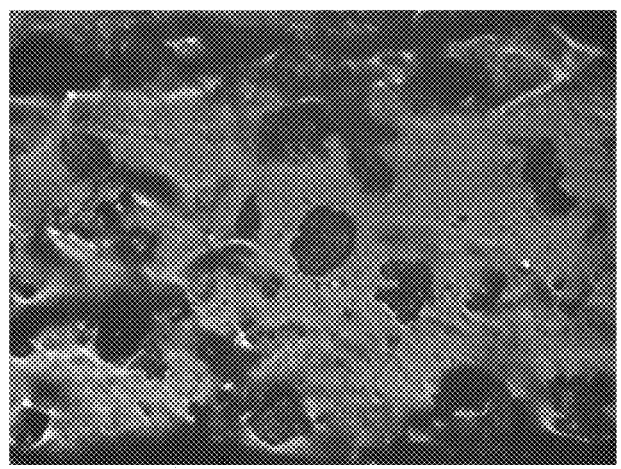
FIG. 1 is 200-fold photograph captured by a metalloscope, showing a side sectional view of an elastic pressure-sensitive adhesive layer of the disclosure.

The technical solution of the disclosure will be further described in conjunction with the embodiments. The embodiments described below are intended for illustrating the technical solutions of the disclosure more clearly, not intended for limiting the protection scope of the disclosure.

A method of preparing an elastic pressure-sensitive adhesive tape comprises steps of:

Step (1): coating an adhesive on a first substrate, and curing for 10 to 30 seconds in a UV curing and drying channel to preliminarily cure the adhesive; wherein components of the adhesive comprise: 1 to 20 parts by mass of quasi-microcapsule powder; 100 to 200 parts by mass of a polyacrylate resin with a carbon-carbon double bond, 20 to 50 parts by mass of a diluent monomer with a carbon-carbon double bond, 1 to 10 parts by mass of a photoinitiator, 1 to 3 parts by mass of an inhibitor, 30 to 50 parts by mass of a liquid-state tackifier resin, 0 to 70 parts by mass of a color paste; wherein a shell material of the quasi-microcapsule powder includes a water soluble polymer, and a core material of the quasi-microcapsule powder includes a low boiling point alkane;

Step (2): reheating for 2 to 5 minutes in the drying channel at gradient temperatures from 70° C. to 100° C. to cause low boiling point alkane to rapidly evaporate, swell, and burst open the shell, thereby forming a plurality of encapsulated bubbles inside the polyacrylate resin;

Step (3): curing for 20 to 40 seconds in the UV curing and drying channel again to completely cure the adhesive, such that an elastic pressure-sensitive adhesive layer is formed on the first substrate, thereby obtaining the elastic pressure-sensitive adhesive tape.

The method of preparing an elastic pressure-sensitive adhesive tape further comprises: laminating a non-substrate side of the elastic pressure-sensitive adhesive layer resulting from step (3) to both sides of a second substrate, respectively, wherein the second substrate is one of PET, PI, PC, and PU, whose surface energy ranges from 36 to 38 dynes/cm; or, double-sided laminating the non-substrate side of the elastic pressure-sensitive adhesive layer resulting from step (3), wherein the first substrate is a release film.

The elastic pressure-sensitive adhesive tape prepared by the method according to the disclosure may be a single-sided adhesive tape or a doubled-sided adhesive tape.

Preparation of the adhesive comprises: adding 20 to 50 parts of UV-cured diluent monomer to an adhesive mixing container, adding sequentially the following to the adhesive mixing container while agitating: 30 to 50 parts of a liquid-state tackifier resin, 100 to 200 parts of a polyacrylate resin with a carbon-carbon double bond, and 1 to 3 parts of an inhibitor till complete dispersion, followed by continued agitation, and adding 1 to 20 parts of microcapsule powder, followed by sequentially adding 1 to 10 parts of a photoinitiator to the mixture while agitating till complete dissolution of the photoinitiator, and then adding 0 to 70 parts of a pigment paste, followed by agitating homogeneously, and filtering for future use.

Preparation of the quasi-microcapsule powder in the method according to the disclosure comprises: swelling 1 to 3 parts by mass of water soluble polymer in the 100 to 200 parts by mass of deionized water, lowering the temperature of the solution to 4° C. to 8° C., adding 3 to 5 parts by mass of low boiling point liquid-state alkane, forming an emulsion by an emulsification pump, the emulsion diameter being controlled to 2 to 5 µm, followed by vacuum freeze drying to remove moisture, thereby forming a dry powder of quasi-microcapsule construction.

Examples of the method of preparing an elastic pressure-sensitive adhesive layer, the method of preparing an elastic pressure-sensitive adhesive tape, and the pressure-sensitive adhesive tape are provided below. The examples below should not be understood as limitations of the scope of the disclosure.

EXAMPLE 1

Raw material proportioning of the quasi-microcapsule powder included (parts by mass): 1 part of water soluble polymer methyl cellulose, 100 parts of deionized water, and 3 parts of neopentane. The preparing process included: sufficiently agitating and dispersing the water soluble polymer methyl cellulose and the deionized water to form a homogeneous mixed solution, followed by cooling the mixed solution to 4 to 8° C.; then mixing the neopentane with the mixed solution, followed by emulsification processing with an emulsification pump, the emulsion diameter being controlled at 2 to 5 µm. The emulsion was subjected to vacuum freeze drying processing to obtain the quasi-microcapsule powder.

Adhesive Proportioning (parts by mass): 1 part of quasi-microcapsule powder, 20 parts of diluent monomer with a carbon-carbon double bond, 100 parts of polyacrylate resin with a carbon-carbon double bond, 30 parts of liquid-state abietin, 1 part of photoinitiator, and 1 part of inhibitor, without pigment paste, wherein the diluent monomer with a carbon-carbon double bond was isobornyl acrylate, the body of the polyacrylate resin with a carbon-carbon double bond had a glass transition temperature within a range from −20° C. to −15° C., the storage modulus and loss modulus thereof being both lower than $10^5$ Pa, the softening point of the liquid-state abietin ranged from 0° C. to 15° C., and the photoinitiator was photoinitiator 184.

The preparing process comprised: precisely weighing the respective components according to the proportioning, first transferring the isobornyl acrylate diluent monomer to an adhesive mixing container, adding sequentially the following to the adhesive mixing container while agitating: liquid-state abietin, polyacrylate resin with a carbon-carbon double bond, and inhibitor till complete dispersion, continuously agitating, followed by adding the prepared quasi-microcapsule powder, followed by continuously adding photoinitiator 184 sequentially in the mixture, agitating till complete dissolution of the photoinitiator, and then filtering for future use.

The elastic pressure-sensitive adhesive tape construction was designed as a carrierless double-sided adhesive tape, the first substrate selected a 50 µm PET-based single-sided silicon release film, whose 20 h aging release force ranged from 10 to 20 gf/25 mm.

The manufacturing used a blade coating line, which had a 15-segment drying channel, with each segment of drying channel being 2 m long; each segment of the drying channel had a UV curing lamp unit and a heating function; the coating line speed was 12 m/min; the UV lamp units of the first, fourteenth, and fifteenth segments of drying channel were activated, while the UV lamp units of the remaining 12 segments of drying channel were inactivated; the temperatures were set according to a gradient from 70° C. to 100° C., i.e., the temperatures from the second to the thirteenth segments of drying channel were sequentially set to 70° C., 70° C., 70° C., 80° C., 80° C., 80° C., 90° C., 90° C., 90° C., 100° C., 100° C., and 100° C. The adhesive was coated on the release film, the thickness of the liquid adhesive was controlled in the range from 40 to 45 µm; after passing through the drying channel, an elastic pressure-sensitive adhesive layer was formed on the release film, wherein the elastic pressure-sensitive adhesive layer had a thickness ranging from 50 to 60 µm, and the compressibility under 0.5 MPa reached 20%.

The non-laminated release film of the elastic pressure-sensitive adhesive layer was subjected to a double-sided laminating process to prepare a carrierless double-sided elastic pressure-sensitive adhesive tape, the total thickness ranging from 100 to 120 µm (the thickness refers to the thickness of the two-layered elastic pressure-sensitive adhesive layer), and the 180° release strength ranging from 1400 to 1800 gf/25 mm.

EXAMPLE 2

Raw material proportioning of the quasi-microcapsule powder comprised (parts by mass): 3 parts of water soluble polymer, 150 parts of dionized water, 4 parts of neopentane, and 1 part of isopentane. The preparing process included: sufficiently agitating and dispersing the water soluble polymer and the deionized water to form a homogeneous mixed solution, followed by cooling the mixed solution to 4 to 8° C.; then mixing the neopentane and the isopentane with the mixed solution, followed by emulsification processing with an emulsification pump, the emulsion diameter being controlled at 2 to 5 μm. The emulsion was then subjected to a vacuum freeze drying process to obtain a quasi-microcapsule powder; wherein the water soluble polymer selects 1 part of carboxymethyl cellulose, 1 part of ethyl cellulose, and 1 part of hydroxyethyl cellulose.

Adhesive Proportioning (parts by mass): 20 parts of quasi-microcapsule powder, 50 parts of diluent monomer with a carbon-carbon double bond, 200 parts of polyacrylate resin with a carbon-carbon double bond, 50 parts of liquid-state abietin, 10 parts of photoinitiator, 3 parts of inhibitor, and 70 parts of black pigment paste, wherein the diluent monomer with a carbon-carbon double bond includes 20 parts of lauryl acrylate and 30 parts of propenoate octadecyl, the polyacrylate resin with a carbon-carbon double bond had a glass transition temperature ranging from −30° C. to −25° C., and the storage modulus and loss modulus thereof were both lower than $10^5$ Pa, the softening point of the liquid-state abietin ranging from −10° C. to 0° C., and the photoinitiator including 4 parts of photoinitiator 184, 3 parts of photoinitiator 369, and 3 parts of TPO photoinitiator.

The preparing process comprised: precisely weighing the respective components according to the proportioning, first transferring the diluent monomer with a carbon-carbon double bond to an adhesive mixing container, adding sequentially the following to the adhesive mixing container while agitating: liquid-state abietin, polyacrylate resin with a carbon-carbon double bond, and inhibitor till sufficient dispersion, followed by continuously agitating, and adding the prepared quasi-microcapsule powder; continuously adding the photoinitiator sequentially in the adhesive, followed by agitating till complete dissolution of the photoinitiator, then adding the pigment paste, followed by homogeneously agitating, and then filtering for future use.

The elastic pressure-sensitive adhesive tape construction was designed as a carrierless double-sided adhesive tape, the first substrate selected a 50 μm PET-based single-sided silicon release film, whose 20 h aging release force ranged from 35 to 50 gf/25 mm.

Figure 2:
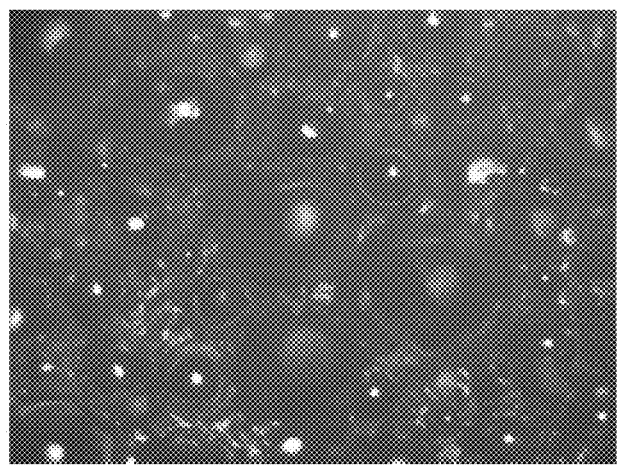
FIG. 2 is a 200-fold photograph captured by metalloscope, showing a side sectional view of a conventional foam.

The manufacturing used a blade coating production line, which had a 15-segment drying channel, with each segment of drying channel being 2 m long; each segment of drying channel had a UV curing lamp unit and a heating function; the coating line speed was 6 m/min; the UV lamp units of the first, fourteenth, and fifteenth segments of drying channel were activated, while the UV lamp units of the remaining 12 segments of drying channel were inactivated; the temperatures were set according to a gradient from 70° C. to 100° C., i.e., the temperatures from the second to the thirteenth segments of drying channel were sequentially set to 70° C., 70° C., 70° C., 80° C., 80° C., 80° C., 90° C., 90° C., 90° C., 100° C., 100° C., and 100° C. The adhesive was coated on the release film, the thickness of the liquid adhesive was controlled in the range from 120 to 125 μm; after passing through the drying channel, an elastic pressure-sensitive adhesive layer was formed on the release film, wherein the elastic pressure-sensitive adhesive layer had a thickness ranging from 230 to 250 μm, and the compressibility under 0.5 MPa reached 53%. By observing the side cross section (after die-cutting) of the adhesive layer, it could be seen that the porous structure had been levelled (see FIG. 1), while pores still existed in the die-cut side interface of the typical foam (see FIG. 2).

The non-laminated release film with the elastic pressure-sensitive adhesive layer was subjected to a double-sided laminating process to prepare a carrierless double-sided elastic pressure-sensitive adhesive tape, the total thickness ranging from 460 to 500 μm (the thickness refers to the thickness of the two-layered elastic pressure-sensitive adhesive layer), and the 180° release strength ranging from 3000 to 3400 gf/25 mm.

EXAMPLE 3

Raw material proportioning of the quasi-microcapsule powder included (parts by mass): 2 parts of water soluble polymer, 200 parts of deionized water, 4 parts of neopentane, and 1 part of n-Pentane. The preparing process included: sufficiently agitating and dispersing the water soluble polymer with the deionized water to form a homogeneous mixed solution, followed by cooling the mixed solution to 4 to 8° C.; then mixing the neopentane and the n-Pentane with the mixed solution, followed by emulsification processing with an emulsification pump, the emulsion diameter being controlled at 2 to 5 μm. The emulsion was then subjected to a vacuum freeze drying process to obtain a quasi-microcapsule powder; wherein the water soluble polymer selected 2 parts of hydroxypropyl methyl cellulose.

Adhesive Proportioning (parts by masses): 7 parts of quasi-microcapsule powder, 35 parts of diluent monomer with a carbon-carbon double bond, 170 parts of polyacrylate resin with a carbon-carbon double bond, 40 parts of liquid-state abietin, 7 parts of photoinitiator, 2 parts of inhibitor, and 30 parts of blue pigment paste, wherein the diluent monomer with a carbon-carbon double bond included 10 parts of isobornyl acrylate and 25 parts of propenoate octadecyl, the polyacrylate resin with a carbon-carbon double bond had a glass transition temperature ranging from −40° C. to −35° C., and the storage modulus and loss modulus thereof were both lower than $10^5$ Pa, the softening point of the liquid-state abietin ranged from −5° C. to 10° C., and the photoinitiator included 4 parts of photoinitiator 1172, 1 parts of photoinitiator 369, and 2 parts of TPO photoinitiator.

The preparing process comprised: precisely weighing the respective components according to the proportioning, first transferring the diluent monomer with a carbon-carbon double bond to an adhesive mixing container, adding sequentially the following to the adhesive mixing container while agitating: liquid-state abietin, polyacrylate resin with a carbon-carbon double bond, and inhibitor till complete dispersion, followed by continuously agitating, and adding the prepared quasi-microcapsule powder to the mixture; followed by continuously adding the photoinitiator sequentially in the adhesive, and agitating till complete dissolution of the photoinitiator, followed by adding the pigment paste and homogeneously agitating, and filtering for future use.

The elastic pressure-sensitive adhesive tape construction was designed as a carrier-based double-sided adhesive tape, the first substrate selected a 75 μm PET-based single-sided silicon release film, whose 20 h aging release force ranged from 20 to 35 gf/25 mm; the second substrate adopted a PET carrier, the thickness was selected to 25 μm, and the surface energy was 36 to 42 dynes/cm.

The manufacturing used a blade coating production line, which had a 15-segment drying channel, with each segment of drying channel being 2 m long; each segment of drying channel had a UV curing lamp unit and a heating function; the coating line speed was 8 m/min; the UV lamp units of the first, second, fourteenth, and fifteenth segments of drying channels were activated, while the UV lamp units of the remaining segments of drying channel were inactivated; the temperatures were set according to a gradient from 70° C. to 100° C., i.e., the temperatures from the third to the thirteenth segments of drying channel were sequentially set to 70° C., 70° C., 70° C., 80° C., 80° C., 80° C., 90° C., 90° C., 90° C., 100° C., and 100° C. The adhesive was coated on the release film, the thickness of the liquid adhesive was controlled in the range from 90 to 95 μm; after passing through the drying channel, an elastic pressure-sensitive adhesive layer was formed on the release film, wherein the elastic pressure-sensitive adhesive layer had a thickness ranging from 135 to 150 μm, and the compressibility under 0.5 MPa reached 37%.

The preparing method further comprised: laminating the non-laminating release film side to two sides of the PET carrier, and the final finished product was a carrier-based double-sided adhesive tape, wherein the total thickness ranged from 295 to 325 μm (the thickness refers to the sum of the thickness of the carrier+the thickness of two-layered elastic pressure-sensitive adhesive layer), and the 180° release strength ranged from 3000 to 3400 gf/25 mm.

EXAMPLE 4

Raw material proportioning of the quasi-microcapsule powder included (parts by mass): 2 parts of water soluble polymer, 170 parts of deionized water, 2 parts of neopentane, and 2 parts of isopentane. The preparing process included: sufficiently agitating and dispersing the water soluble polymer and the deionized water to form a homogeneous mixed solution, followed by cooling the mixed solution to 4 to 8° C.; then mixing the neopentane and the isopentane with the mixed solution, followed by emulsification processing with an emulsification pump, the emulsion diameter being controlled at 2 to 5 μm. The emulsion was then subjected to vacuum freeze drying processing to obtain a quasi-microcapsule powder; wherein the water soluble polymer selected 1 part of hydroxyethyl cellulose, and 1 part of hydroxypropyl cellulose.

Adhesive Proportioning (parts by mass): 18 parts of quasi-microcapsule powder, 43 parts of diluent monomer with a carbon-carbon double bond, 135 parts of polyacrylate resin with a carbon-carbon double bond, 35 parts of liquid-state abietin, 5 parts of photoinitiator, 2 parts of inhibitor, and 55 parts of white pigment paste, wherein the diluent monomer with a carbon-carbon double bond included 23 parts of isobornyl acrylate, 10 parts of lauryl acrylate, and 10 parts of propenoate octadecyl; the polyacrylate resin with a carbon-carbon double bond had a glass transition temperature ranging from −25° C. to −20° C., and the storage modulus and loss modulus thereby were both lower than $10^5$ Pa, the softening point of the liquid-state abietin ranged from −10° C. to 5° C., and the photoinitiator included 2 parts of photoinitiator 184, 1 part of photoinitiator 1172, and 2 parts of TPO photoinitiator.

The preparing process comprised: precisely weighing the respective components according to the proportioning, first transferring the diluent monomer with a carbon-carbon double bond to an adhesive mixing container, adding sequentially the following to the adhesive mixing container while agitating: liquid-state tackifier resin, polyacrylate resin with a carbon-carbon double bond, and inhibitor till complete dispersion, followed by continuously agitating, then adding the prepared quasi-microcapsule powder to the mixture; followed by continuously adding the photoinitiator sequentially in the adhesive, and agitating till complete dissolution of the photoinitiator, followed by adding the pigment paste and homogeneously agitating, and filtering for future use.

The elastic pressure-sensitive adhesive tape construction was designed as a carrier-based double-sided adhesive tape, the first substrate selected a 75 μm PET-based single-sided silicon release film, whose 20 h aging release force ranged from 20 to 35 gf/25 mm; the second substrate adopted a 25 μm PI carrier, and the surface energy was 64 to 68 dynes/cm.

The manufacturing used a blade coating production line, which had a 12-segment drying channel, with each segment of drying channel being 2 m long; each segment of drying channel had a UV curing lamp unit and a heating function; the coating line speed was 4 m/min; the UV lamp units of the first and twelfth segments of drying channel were activated, while the UV lamp units of the remaining segments of drying channel were inactivated; the temperatures were set according to the gradient from 70° C. to 100° C., i.e., the temperatures from the second to the eleventh segments of drying channel were sequentially set to 70° C., 70° C., 70° C., 80° C., 80° C., 90° C., 90° C., 100° C., 100° C., and 100° C. The adhesive was coated on the release film, the thickness of the liquid adhesive was controlled in the range from 90 to 95 μm; after passing through the drying channel, an elastic pressure-sensitive adhesive layer was formed on the release film, wherein the elastic pressure-sensitive adhesive layer had a thickness ranging from 230 to 250 μm, and the compressibility under 0.5 MPa reached 70%.

The preparing method further comprised laminating the non-laminating release surface of the resulting elastic pressure-sensitive adhesive tape to two sides of the PI carrier, and the final finished product was a carrier-based double-sided adhesive tape. In the double-sided adhesive tape, the total thickness of the two-layered pressure-sensitive adhesive layer ranged from 485 to 525 μm (the thickness referred to the sum of the thickness of the carrier+the thickness of the two-layered elastic pressure-sensitive adhesive layer), and the 180° release strength ranged from 2300 to 2800 gf/25 mm.

What have been described above are only preferred embodiments of the disclosure. Although the description is relatively specific and detailed, the preferred embodiments cannot be understood as limiting to the scope of the disclosure. It is noted that to those of normal skill in the art, various alternations and improvements may be made without departing from the spirit of the disclosure, and such alternations and improvements should also be deemed as falling into the protection scope of the present disclosure.

We claim:

1. A method of preparing an elastic pressure-sensitive adhesive tape, comprising the steps of:
    Step (1): coating an adhesive on a first substrate, and curing for 10 to 30 seconds in a UV curing and drying channel to preliminarily cure the adhesive; wherein components of the adhesive include: 1 to 20 parts by mass of quasi-microcapsule powder; 100 to 200 parts by mass of polyacrylate resin with a carbon-carbon double bond, 20 to 50 parts by mass of diluent monomer with a carbon-carbon double bond, 1 to 10 parts by mass of photoinitiator, 1 to 3 parts by mass of inhibitor, 30 to 50 parts by mass of liquid-state tackifier resin, 0 to 70 parts by mass of color paste; wherein a shell of the quasi-microcapsule powder includes a water soluble polymer, and a core material of the quasi-microcapsule powder includes a low boiling point alkane; wherein the low boiling point alkane is one or more of n-pentane, isopentane, and neopentane;
    Step (2): after the preliminary cure is completed, heating for 2 to 5 minutes in the UV curing and drying channel using a temperature gradient that increases from 70° C.

to 100° C. to cause the low boiling point alkane to rapidly evaporate, swell, and burst the shell, thereby forming a plurality of encapsulated bubbles inside the polyacrylate resin;

Step (3): after forming the encapsulated bubbles, further curing for 20 to 40 seconds in the UV curing and drying channel to completely cure the adhesive and thus form an elastic pressure-sensitive adhesive layer on the first substrate, thereby obtaining the elastic pressure-sensitive adhesive tape.

2. The method of preparing the elastic pressure-sensitive adhesive tape according to claim 1, wherein preparation of the adhesive comprises:

first adding the diluent monomer to an adhesive mixing container, adding sequentially the following to the adhesive mixing container while agitating: the liquid-state tackifier resin, the polyacrylate resin, and the inhibitor until complete dispersion, followed by continuing agitation, and adding the quasi-microcapsule powder; further sequentially adding the photoinitiator to the adhesive mixing container while agitating until complete dissolution of the photoinitiator, and then adding the color paste, followed by agitating homogeneously, and filtering for future use.

3. The method of preparing the elastic pressure-sensitive adhesive tape according to claim 1, wherein preparation of the quasi-microcapsule powder comprises: swelling 1 to 3 parts of the water soluble polymer in 100 to 200 parts of deionized water to form a solution, lowering the temperature of the solution to 4° C. to 8° C., adding 3 to 5 parts of the low boiling point liquid-state alkane and forming an emulsion by processing with an emulsification pump to control the emulsion diameter to 2 to 5 μm, followed by vacuum freeze drying to remove moisture, thereby forming the quasi-microcapsule powder as a dry powder.

4. The method of preparing the elastic pressure-sensitive adhesive tape according to claim 1, wherein a glass transition temperature of the polyacrylate resin is −40° C. to −15° C., and a storage modulus and loss modulus thereof are both lower than $10^5$ Pa.

5. The method of preparing the elastic pressure-sensitive adhesive tape according to claim 1, wherein: the liquid-state tackifier resin is a liquid-state abietin having a softening point of −10° C. to 15° C.; the photoinitiator is selected from one or more of photoinitiator 184, photoinitiator 127, photoinitiator 369, and TPO photoinitiator; and the inhibitor is hydroquinone.

6. The method of preparing the elastic pressure-sensitive adhesive tape according to claim 1, wherein the water soluble polymer is selected from one or more of methylcellulose, carboxymethyl cellulose, ethyl cellulose, hydroxyethyl cellulose, hydroxypropyl cellulose, and hydroxypropyl methyl cellulose.

7. The method of preparing the elastic pressure-sensitive adhesive tape according to claim 1, wherein the encapsulated bubbles have diameters ranging from 30 to 150 μm; and the elastic pressure-sensitive adhesive layer has a thickness from 50 to 250 μm.

8. The method of preparing the elastic pressure-sensitive adhesive tape according to claim 1, wherein the first substrate is a polyethylene terephthalate (PET)-based silicon release film having a 20-hour aging release force from 10 gf/25 mm to 50 gf/25 mm.

9. The method of preparing the elastic pressure-sensitive adhesive tape according to claim 1, further comprising: providing two elastic pressure-sensitive adhesive tapes, laminating each of the elastic pressure-sensitive adhesive tapes on opposing sides of a second substrate so that the first substrate of each of the elastic pressure-sensitive adhesive tapes is opposite the second substrate, wherein the second substrate is one of PET, polyimide, polycarbonate, or polyurethane and has a surface energy of 36 to 38 dynes/cm.

\* \* \* \* \*